May 19, 1970  D. P. JUHASZ ET AL  3,512,433
POSITIVE FEED DRILL
Filed Nov. 29, 1967  2 Sheets-Sheet 1
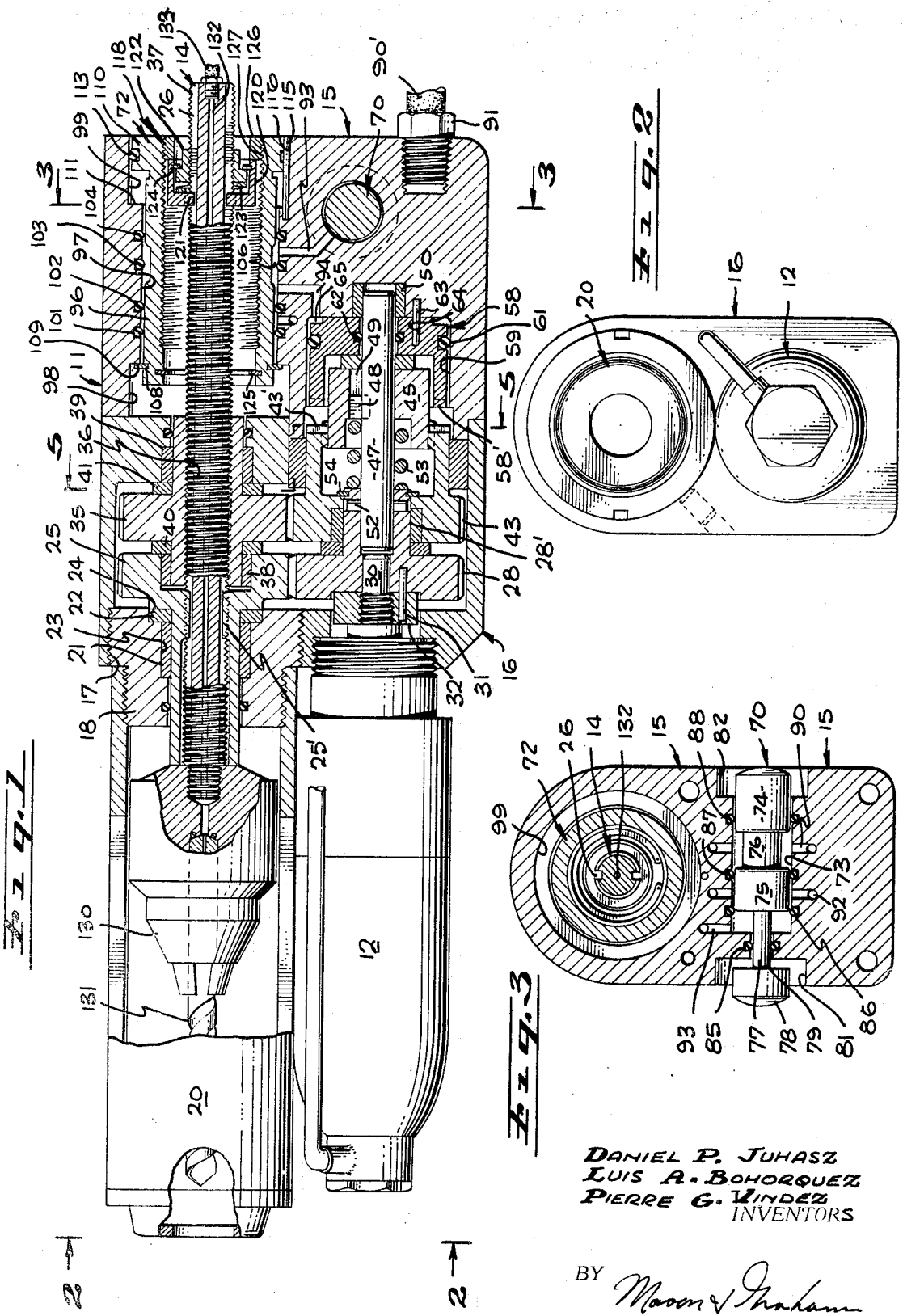
DANIEL P. JUHASZ
LUIS A. BOHORQUEZ
PIERRE G. VINDEZ
INVENTORS
BY Mason & Graham
ATTORNEYS

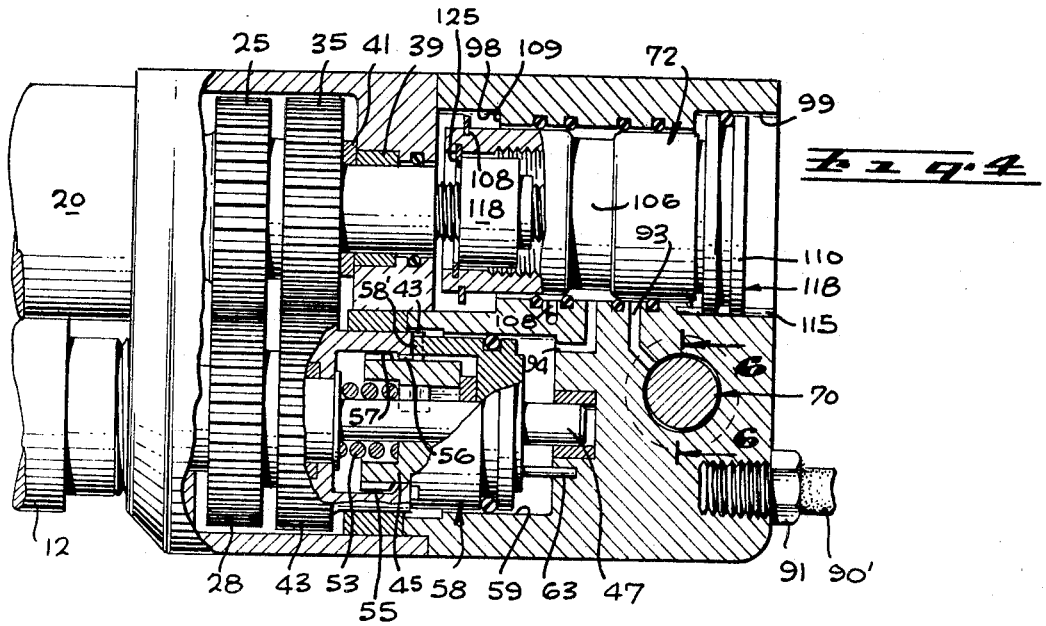
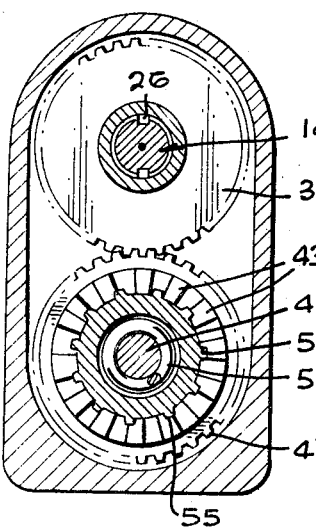
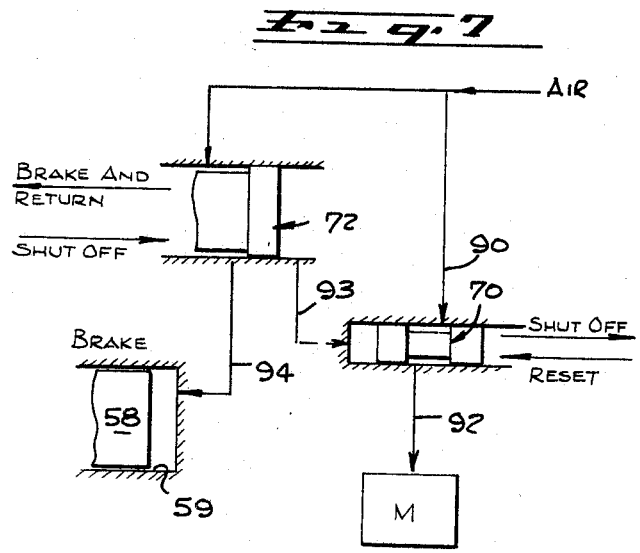
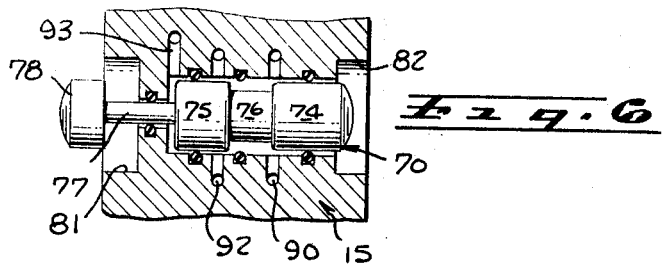
DANIEL P. JUHASZ
LUIS A. BOHORQUEZ
PIERRE G. VINDEZ
INVENTORS

United States Patent Office 3,512,433
Patented May 19, 1970

3,512,433
POSITIVE FEED DRILL
Daniel P. Juhasz, Gardenia, Luis A. Bohorquez, Inglewood, and Pierre G. Vindez, Redondo Beach, Calif., assignors to Zephyr Manufacturing Co., Inc.—Manufacturing Division, Inglewood, Calif., a corporation of California
Filed Nov. 29, 1967, Ser. No. 686,476
Int. Cl. B23b 45/04
U.S. Cl. 77—7
12 Claims

ABSTRACT OF THE DISCLOSURE

The application discloses a portable power drill adapted to be mounted on various tools and fixtures and embodying a drill spindle and motor in parallel relation, a drive gear train for rotating the spindle, a feed gear train for advancing and retracting the spindle, and a mechano-fluid means for controlling the feed gear train embodying means for adjusting the length and position of the stroke of the spindle, including automatic means for stopping the motor when the spindle has retracted a predetermined distance.

---

The invention relates generally to drills, such as portable drills, handheld drills, and other drills of small size which can be mounted on various tools and fixtures and more particularly to mechanisms incorporated in such drills for advancing and retracting the drill spindle and for automatically accomplishing this and for controlling operation of the drill.

An object of the invention is to provide a new and improved power drill embodying novel means for rotating, advancing, and retracting the drill spindle together with novel means for automatically stopping operation of the drill upon retraction of the spindle a predetermined amount. In this connection it is an object to provide such means which operates to maintain the drill rotating in the same direction during retraction as during feed thereof.

A further object is to provide an extremely compact mechanism in a drill which incorporates a motor, a drill spindle with associated gearing for driving the spindle and advancing and retracting it together with control means associated therewith. More particularly it is an object to provide such a compact mechanism in which the motor and drill spindle are disposed closely adjacent in parallel relation.

Another object is to provide a combined mechanical and pneumatic control means for regulating the stroke of the spindle and for controlling the advance and retraction thereof wherein the drill spindle is concentrically disposed within a main or master valve element which is in turn operated by axial movement of the spindle. A further object is to provide a pilot or slave valve controlled by the main valve but also operable manually to start or stop the motor.

These and other objects will be apparent from the drawings and the following description. Referring to the drawings:

FIG. 1 is a central longitudinal sectional view, partly in elevation, of a drill embodying the invention;
FIG. 2 is an end elevational view on line 2—2 of FIG. 1;
FIG. 3 is a sectional view on line 3—3 of FIG. 1;
FIG. 4 is a view similar to FIG. 1 of a portion of the drill with parts shown in a different position;
FIG. 5 is a sectional view on line 5—5 of FIG. 1;
FIG. 6 is a fragmentary sectional view on line 6—6 of FIG. 4; and
FIG. 7 is a diagrammatic view of the fluid system.

More particularly describing the invention, in the drawings, by way of example, we show an extremely compact drill in which the motor and the spindle are disposed closely adjacent in parallel relation, that is, with the motor shaft parallel to the drill spindle. The drill embodies two gear trains. One gear train rotates or drives the spindle at all times when the motor is operating and the other gear train feeds or retracts the spindle, depending upon whether it is engaged to be driven by the motor or not, respectively. The device is of the air-driven type, that is, the motor is an air-driven one, and the control means is a combined mechanical and fluid system wherein means on the spindle is used to operate a main valve in a fluid system which in turn controls the flow of air in the system to the motor and to means for controlling the feed.

Referring more particularly to the drawings, the housing is designated by numeral 11, the motor by 12, and the spindle by 14. The housing includes a rear housing member 15 and a front housing member 16, these being held together by suitable cap screws (not shown) or other conventional means. The front housing member has a threaded bore 17 to receive an externally threaded annular adapter 18 upon which a nose 20 is mounted. The adapter also supports bearings 21 and 22 in counterbores 23 and 24, respectively, which serve to rotatably mount a drive gear 25 having internal splines 25' received in grooves 26 in the spindle. Drive gear 25 is driven by the motor through a spur gear 28 mounted on the motor shaft 30 and fixed thereto by a shear pin 31 in a nut 32 threaded on the shaft.

Behind the drive gear 25 is a feed gear 35 which has an internally threaded bore 36 to receive the spindle, the latter having external screw threads 37. This gear is journaled in bearings 38 and 39 in the drive gear and front housing member, respectively. Thrust bearings 40 and 41 are provided between the parts. The feed gear 35 meshes with a spur gear 43 that is mounted for rotation on the hub 28' of gear 28. Gear 43 is driven by a coupling member 45 that is movable for a limited distance axially of a shaft 47 but rotatively fixed thereto by a key 48 in the shaft and a keyway 49 in the member. The shaft is journaled at one end in a bearing 50 provided in the rear housing member. Its other end is received in the hub 28' of gear 28 and is fixed thereto by a pin 52. A spring 53 between gear 28 and a coupling member 45 serves to yieldably retain the parts in the position shown in FIG. 1. When in this position the coupling member 45 is in driving engagement with gear 43 by a spline connection comprising splines 55 of short length on the coupling member and grooves 56 in a narrow internal land 57 of gear 43.

As will later appear, couping member 45 is movable axially forward against spring 53 into a position where it becomes disengaged from gear 43, and hence in such position the feed gear is not driven. The means for so shifting the coupling member includes a brake member 58 which serves as a piston, being mounted in a bore 59 in the rear housing member 15. Member 58 is provided with a peripheral seal ring 61 and an internal seal ring 62. Also, it is held against rotation by a pin 63 mounted in the housing and slideable in a bore 64 in the piston. The brake member is relieved by a marginal recess 65 on its rear surface so that air (or other desired fluid) under pressure can readily be admitted behind it to move it forward.

The brake member not only acts as a piston to move the coupling member 45 forward out of engagement with gear 43, but also acts to restrain rotation thereof by engaging a serrated face 43' on the end of the gear, the brake member having a mating face 58' on its forward end for that purpose. Thus, when pressure is applied behind the brake member, it moves the coupling member forward and disengages it from the motor and the spindle drive train, and at the same time prevents rotation of the spindle feed train by engaging gear 43 so that the spindle, which continues to be rotated by the drive gear, rapidly retracts through the now stationary feed gear. In this connection the spindle is threaded oppositely to the direction it is rotated by the drive gear.

For the purpose of manually and automatically controlling the operation of the device, including stopping of the air-driven motor after the spindle has retracted, we provide a fluid control system embodying two valves, one of which will be termed a pilot or slave valve and the other a main or master valve. The pilot valve is generally designated by numeral 70 and the other by numeral 72.

Referring first to the pilot valve 70, this comprises a spool-like valve element mounted in a bore 73 extending transversely of the rear housing 15. The valve has two enlarged cylindrical sections 74 and 75 with a radially reduced intermediate section 76 and at one end is provided with a stem 77 having a knob 78. The stem passes through a small bore 79 at the end of the main valve chamber 73. The housing is recessed at 81 and 82 at each side so that the valve can be manipulated by hand. Seal rings 85, 86, 87, and 88 are provided as best shown in FIGS. 3 and 6. An air inlet passage 90 to the valve bore leads from a source of air under pressure (not shown) which can be connected to the drill by a hose 90' and fitting 91. Numeral 92 designates a passage leading from the valve bore to the motor. Numeral 93 designates a passage leading to valve 72 which is connected with the brake cylinder 59 through passage 94 when the parts are in the position of FIG. 1.

Referring to valve 72, this has a generally cylindrical body 96 which is received in a bore 97 intermediate counterbores 98 and 99 all formed in the rear housing member 15. Seal rings 101, 102, 103 and 104 are provided to engage the valve element. The latter has a peripheral recess 106 to establish communication between the various ports or passages, namely, selectively between an air supply passage or port 108 and passage 94 or between the latter and passage 93.

Valve element 72 is mounted for limited longitudinal movement in the bore 97, having a retainer ring 108 at its inner end adapted to abut shoulder 109 and having a flange 110 at its outer end adapted to abut shoulder 111. A seal ring 113 is provided around the flange. A pin 115 in the housing is partially received in a groove 116 in the flange 110 to prevent rotation of the valve element.

For the purpose of actuating the valve element, we provide a nut assembly 118 on the spindle and this is adjustable therealong to the desired place. This comprises a housing 120 with opposing keys 121 that fit into the grooves of the spindle and a nut 122 that threads onto the spindle together with a spring washer 123 between the parts and a retaining ring 124. This assembly works in conjunction with an internal retainer ring 125 at the inner end of the valve element and with a spool nut 126 that is adjustable axially along the interior of the valve element which is interiorly threaded at 127. Thus both the length of the strokes and the position of the stroke can be adjusted by means of the nut assembly and the spool nut.

The spindle is shown provided with a chuck 130 holding a drill 131. If desired, the spindle may be provided with a fluid passage 132 therethrough from end to end and the outer end tapped to mount a rotary fitting 133 through which drilling fluid can be supplied to the drill under pressure from a suitable source.

In the operation of the device, assuming the parts are as shown in FIGS. 1 and 3, the motor is stopped since the spindle has retracted and moved the main valve to the right exhausting air from cylinder 59 behind the brake member 58 into the pilot or slave valve 70 through passages 94 and 93 to move valve 70 from the position of FIG. 6 to that of FIG. 3. This closes the supply of air to the motor through this valve from passage 90 to passage 92.

To start the drill, valve 70 is manually reset to the position of FIG. 6, thereby supplying air to the motor. Both gear trains are operative as spring 53 holds coupling member 45 and brake element 58 in the position of FIG. 1. The spindle feeds forward through feed gear 35 since the gear ratio of the feed gear train and the drive gear train are slightly different. When the nut assembly 118 strikes retainer ring 125 the valve spool 72 is carried forward to the position of FIG. 4, causing air under pressure to be supplied to cylinder 59. This moves brake 58 forward, disengaging coupling member 45 from gear 43 and engaging the latter to stop its rotation and that of the feed gear 35. The spindle then rapidly retracts until the nut assembly 118 engages spool nut 126 and returns the valve spool 72 to the position of FIG. 1, causing the motor to stop, as previously pointed out.

Although we have illustrated and described a preferred form of my invention, we contemplate that various changes and modifications can be made therein without departing from the invention, the scope of which is indicated by the following claims.

We claim:

1. In a positive feed drill, a housing, a spindle in the housing having external screw threads and adapted to mount a drill bit, a first gear train including a drive gear receiving said spindle and keyed thereto, said spindle being axially movable through said drive gear, said first gear train including a drive shaft adapted to be driven by a motor, a second gear train including an internally threaded feed gear threadedly receiving said spindle, a coupling member keyed to said shaft and mounted for limited axial movement thereon, said coupling member being normally engaged with an element of said second gear train in one position to drive the same and being disengaged therefrom in another position, a piston brake member within said housing adapted, when actuated by fluid pressure, to disengage said coupling member from said second gear train by shifting the same axially and adapted to engage a member of said second gear train and restrain the same against rotation, and a main valve operable in response to movement of the drill spindle for controlling flow of fluid to said piston brake member.

2. The drill set forth in claim 1 in which the valve is a tubular spool concentric with said spindle and receiving the same and in which said spindle is provided with a nut means adjustable along the spindle and operably engageable with the valve.

3. The drill set forth in claim1 in which a spring means yieldably normally holds said coupling member engaged with said second gear train and said brake member out of engagement therewith.

4. A positive feed drill, comprising a housing, a motor on the housing, an externally threaded drill spindle, a drive gear journaled in the housing connected to be driven by the motor and keyed to said spindle with the spindle movable axially therethrough, an internally threaded feed gear journaled in the housing and threadedly receiving said spindle, disengageable coupling means between the motor and said feed gear, means for disengaging said coupling means including a fluid-powered feed gear brake member, control means for said fluid-powered member including a fluid circuit for supplying fluid under pressure to the member and a master valve in said circuit through which said spindle extends, and means on said spindle engageable with said valve to operate the same.

5. The drill set forth in claim 4 in which the motor is fluid-operated, and in which a slave valve connected to be controlled by said master valve is provided controlling flow of fluid to said motor.

6. The drill set forth in claim 4 in which said master valve comprises a tubular spool concentric with the spindle and received in a valve bore in the housing concentric with the spindle, and in which the means on the spindle engageable with the valve comprises a nut assembly adjustably positionable along the spindle.

7. In a power drill, a housing, a motor operated on gas under pressure mounted in the housing, an externally threaded drill spindle in the housing, a drive gear journaled in the housing and receiving said spindle, said drive gear being keyed to the spindle with the spindle movable axially through the gear, a drive connection between the motor and the drive gear, an internally threaded feed gear journaled in the housing and receiving said spindle, disengageable coupling means connecting said feed gear to said motor, a piston controlling said coupling means, a master valve in the housing responsive to predetermined movement of the spindle for controlling flow of pressure gas to said piston, and a slave valve in said housing controlled by said master valve and in turn controlling flow of pressure gas to the motor, said housing providing an operative system of fluid passages connecting said valves, said piston and said motor and providing a connection for attachment of a pressure gas supply hose.

8. The power drill set forth in claim 7 in which said housing includes a front section and a rear section and means detachably securing the same together, and in which a cylindrical valve chamber is provided in the rear section of the housing concentric with said spindle receiving said master valve.

9. The power drill set forth in claim 8 in which a cylindrical valve chamber is provided in the rear section of the housing extending transversely thereof receiving said slave valve.

10. In a positive feed drill, a housing, said housing having a front section and a rear section and means securing the same together, an externally threaded drill spindle extending through said housing sections, a drive gear journaled in said front housing section, a feed gear journaled in said front housing section, said drive gear receiving and being keyed to said spindle with the spindle movable axially through the gear, said feed gear being internally threaded and threadedly receiving said spindle, a motor mounted on said front housing section and providing a drive shaft therein parallel to said spindle, a pinion fixed to said shaft and meshing with said drive gear, a coupling member keyed to said shaft and movable axially thereon, an intermediate gear between said feed gear and said coupling member, said intermediate gear and coupling member having a splined connection in one position of the coupling member, a spring yieldably holding said coupling member in said one position, said rear housing member having a cylindrical chamber concentric with said shaft, a piston brake member in said chamber and movable under the influence of fluid pressure to shift said coupling member against said spring and out of engagement with said intermediate gear, said brake member being adapted to engage said intermediate gear and hold the same against rotation when said coupling member is disengaged from such gear, and a fluid supply and control system for said motor and said piston built into said housing.

11. The drill set forth in claim 10 in which said rear housing section is provided with a cylindrical chamber concentric with said spindle and provided with a valve therein operable in response to said spindle, said valve being a part of said control system.

12. The drill set forth in claim 11 in which said rear housing section is provided with a slave valve responsive to said master valve and manually operable and connected in said fluid control system for controlling flow of fluid to said motor.

References Cited

UNITED STATES PATENTS

| 3,429,206 | 2/1969 | Quackenbush | 77—34.7 |
| 3,124,817 | 3/1964 | Mosier | 77—34.7 XR |
| 3,075,415 | 1/1963 | Dabringhaus | 77—34.7 |
| 2,791,922 | 5/1957 | Robinson | 77—34.4 |

FRANCIS S. HUSAR, Primary Examiner

U.S. Cl. X.R.

77—32.1, 32.9, 34.4, 34.7